United States Patent [19]

Mifsud

[11] Patent Number: 4,578,784
[45] Date of Patent: Mar. 25, 1986

[54] TUNABLE MARINE SEISMIC SOURCE

[75] Inventor: Joseph F. Mifsud, Houston, Tex.

[73] Assignee: Exxon Production Research Co., Houston, Tex.

[21] Appl. No.: 444,279

[22] Filed: Nov. 24, 1982

Related U.S. Application Data

[63] Continuation-in-part of Ser. No. 235,202, Feb. 7, 1981, Pat. No. 4,483,411.

[51] Int. Cl.⁴ .......................... G01V 1/38; H04B 13/00
[52] U.S. Cl. ..................................... 367/143; 367/109; 181/110; 181/120
[58] Field of Search .................. 367/143, 189, 190; 73/665, 666; 181/110, 119, 120

[56] References Cited

U.S. PATENT DOCUMENTS

| | | | |
|---|---|---|---|
| 3,246,289 | 4/1966 | Mellen | 181/120 |
| 3,384,868 | 5/1968 | Brown et al. | 367/143 |
| 3,386,525 | 6/1968 | Landrum et al. | 367/189 |
| 3,392,369 | 7/1968 | Dickie et al. | 181/120 |
| 3,394,775 | 7/1968 | Cole et al. | 181/120 |
| 3,403,374 | 9/1968 | Mellen et al. | 181/120 |
| 3,482,646 | 12/1969 | Brown et al. | 181/120 |
| 4,014,403 | 3/1977 | Mifsud | 367/190 |
| 4,030,063 | 6/1977 | Wallen | 181/120 |
| 4,211,301 | 7/1980 | Mifsud | 181/120 |
| 4,410,062 | 10/1983 | Mifsud | 367/189 |

FOREIGN PATENT DOCUMENTS 2093187 8/1982 United Kingdom .................. 367/15

OTHER PUBLICATIONS

Broding et al., "A High-Power ... Vibrosius System", 4/71, pp. 90–95, IEEE Trans. Geoscience Elect., vol. GE 9, No. 2.

Primary Examiner—Nelson Moskowitz
Attorney, Agent, or Firm—Keith A. Bell

[57] ABSTRACT

The disclosed device is a marine seismic source which produces a varying FM signal often in the 10–100 Hertz region of the spectrum. The seismic source uses stiff oscillating radiators to create a signal in the water. These radiators are actuated by hydraulic cylinders which are in hydraulic communication with hydraulic or oleo-pneumatic variable devices acting as springs with a variable spring rate. Variation of the spring rate as a function of the frequency permits the device to be tuned for maximum power output.

17 Claims, 8 Drawing Figures

TUNABLE MARINE SEISMIC SOURCE

RELATED APPLICATION

This is a continuation-in-part of U.S. patent application Ser. No. 235,202, now U.S. Pat. No. 4,483,411, entitled "Tunable Marine Seismic Source", filed Feb. 7, 1981; the entirety of which is incorporated by reference.

BACKGROUND OF THE INVENTION

1. Object of the Invention

This invention relates to a tunable seismic energy source used to generate seismic signals in searching for petroleum beneath a water body. In particular, it relates to apparatus suitable for continuously tuning the output mechanical impedance of a seismic source so that a high percentage of the energy applied to the source transducer is converted to acoustic energy. The seismic source desirably is of the type producing a frequency modulated wave that sweeps the spectrum between about 10 and 100 Hz.

2. Field of the Invention

The ever more difficult search for petroleum has led to exploration in areas which were thought by many just a short time ago to be incapable of producing petroleum at an economically feasible price. The rising price of petroleum coupled with its relative domestic scarcity has made acceptable the costs associated with production in Alaska and the North Sea, as well as in a number of offshore areas.

Of the many methods used in prospecting for subsea petroleum, few have attained as widespread an acceptance as has the use of towable marine seismic sources.

The theory of operation in using marine seismic sources to search for petroleum is quite simple. An acoustic signal is introduced into the water body. The acoustic wave propagates down through the water, across the water-floor interface, and into subfloor geologic formations. The resultant echoes are, to some extent, reflected back across the same path to an array of hydrophones located near the water's surface. Analysis of the signals produced by the hydrophones can provide some information concerning the structure of the subfloor geological formations and attendant petroleum accumulation in those formations.

The term "water" as used herein is meant to include swampwater, mud, marshwater, seawater or any other liquid containing sufficient water to enable operation of the invention.

There are many different methods of producing an acoustic pulse. For instance, the earliest attempts entailed the use of solid explosives. This method produces a strong low frequency wave which, accordingly, achieves substantial penetration into subfloor geologic formations and a strong return echo. However, solid explosives possess certain inherent drawbacks: they are dangerous to store, handle, and use. When set off in open water, they kill marine life. In a crowded area such as a harbor, they cannot be used at all. Solid explosives are orders of magnitude more expensive to use, on a per-shot basis, than are most other acoustic sources. Modification of the acoustic signature to achieve an acceptable frequency spectrum distribution is most difficult.

Apparatus using exposive gas mixtures, e.g., propane and oxygen, to produce an acoustic signal in the form of a pulse or shock wave have gained wide acceptance. The two major types of explosive gas guns are: first, those which operate by exploding a gas mixture behind a flexible membrane which is in contact with the water; and, second, those which operate by allowing the abrupt bubble from the gas explosion to pass directly into the water. An example of the former apparatus can be found in U.S. Pat. No. 3,658,149; an example of the latter apparatus can be found in U.S. Pat. No. 4,193,472.

Other devices using high pressure compressed gases to generate an acoustic pulse have also gained wide acceptance in the industry. These apparatus, or guns, typically employ a gas-holding chamber which is pressurized to attain some pre-set level and is fired by allowing the pressurized gas to explosively exit the gun into the surrounding water. Examples of open-ported pressurized gas guns are found in U.S. Pat. No. 3,653,460, to Chelminski, and U.S. Pat. No. 4,141,431, to Baird.

The device of the present invention is a member of a class which generates a relatively low-power and low-frequency (10–100 Hz) signal known as a "chirp" which extends over a period of seconds. The transmitted signals are desirably low-frequency to reduce attenuation losses in the reflected waves. Unlike the previously mentioned devices which emit a short duration pulse and thereby provide a discrete echo at some readily determinable point in time, the chirp devices often vary the frequency of the transmitted signal in some pre-set manner so that a unique frequency in the reflected signal can be correlated as a function of time with that same frequency in the transmitted signal. A collection of received signals or "trace" can be mathematically manipulated to produce a subterranean map.

The transducer in subsea vibrator devices typically is an acoustic piston or plate in contact with the water and driven by a pneumatic or hydraulic actuator modulated at the desired frequency. An example of such a device is found in U.S. Pat. No. 4,211,301, to Mifsud. The patent does not discuss methods of continuously tuning the source for maximum output.

There is a limit to the amount of energy that can be introducced into a subsea acoustic wave. That amount depends on, inter alia, the size of the transducer, the amplitude of oscillation, the depth of source placement, temperature and salinity of the water, and the frequency of the transmission. When this threshold amount of induced energy is exceeded, the source cavitates and produces gas bubbles rather than a clean acoustic signal. Nevertheless, the strength of the acoustic signal should be maximized to assure the strongest possible echo. The invention disclosed herein deals with apparatus suitable for maximizing the efficiency of such a marine seismic source by adjusting its output acoustic impedance so that a higher percentage of the input power is used to radiate acoustic energy.

Other marine seismic sources are known which provide for the prevention of cavitation. The disclosure in U.S. Pat. No. 3,691,516, to Graham et al, provides a description of an apparatus having a pair of pistons located at opposite ends of the device. The pistons are held outward from the center of the seismic source by a pair of variable volume chambers. The pressure within the variable volume chambers is repetitively varied downward and then returned to the initial value. This sharp reduction in pressure causes the pistons to move inward initiating the pulse. Hydraulic cylinders attached to the pistons via piston rods then tend to restore the pistons to their original extended positions. The acceleration rate of the pistons is controlled using a feedback loop so that the pistons produce the maximum possible acoustic output power as limited by the cavitation threshold. The acceleration rate is varied by pressure control of the fluid introduced into the aforementioned hydraulic cylinders. The frequency of the device is changed by a fulcrum and beam arrangement operating in conjunction with the piston-restoring hydraulic cylinders.

The Graham et al device produces a pulse which has the maximum power attainable for the physical size of the acoustic pistons in their particular surrounding fluid. The device desirably operates just below the cavitation threshold. The device does not vary its output impedance to maximize output at a particular available power input using the apparatus of the instant invention.

Other marine seismic sources which suggest tuning the source for maximum output are typified by: U.S. Pat. No. 3,349,367, to Wisotsky; U.S. Pat. 3,392,369, to Dickie et al; U.S. Pat. No. 4,030,063, to Wallen; and U.S. Pat. No. 4,142,171, to Pickens. Each of these patents involves a single frequency source.

SUMMARY OF THE INVENTION

The inventive marine seismic source has two radiating plates, mounted at opposite ends of a supporting frame, which are driven by a balanced double-ended, push-pull hydraulic drive cylinder. The source produces a frequency modulated signal which may be linearly swept through a low frequency spectrum by modulation of the hydraulic fluid pressure introduced into the drive cylinder. The mechanical impedance of the radiating plates is continuously varied with the sweeping frequency by an oleo-pneumatic or hydraulic spring. Adjustment of the effective spring rate of the spring effectively optimizes the efficiency of the device by tuning the instantaneous output impedance of the radiating plates to one consisting mainly of radiation resistance for the instantaneous frequency.

DESCRIPTION OF THE PREFERRED EMBODIMENTS

Figure 1:
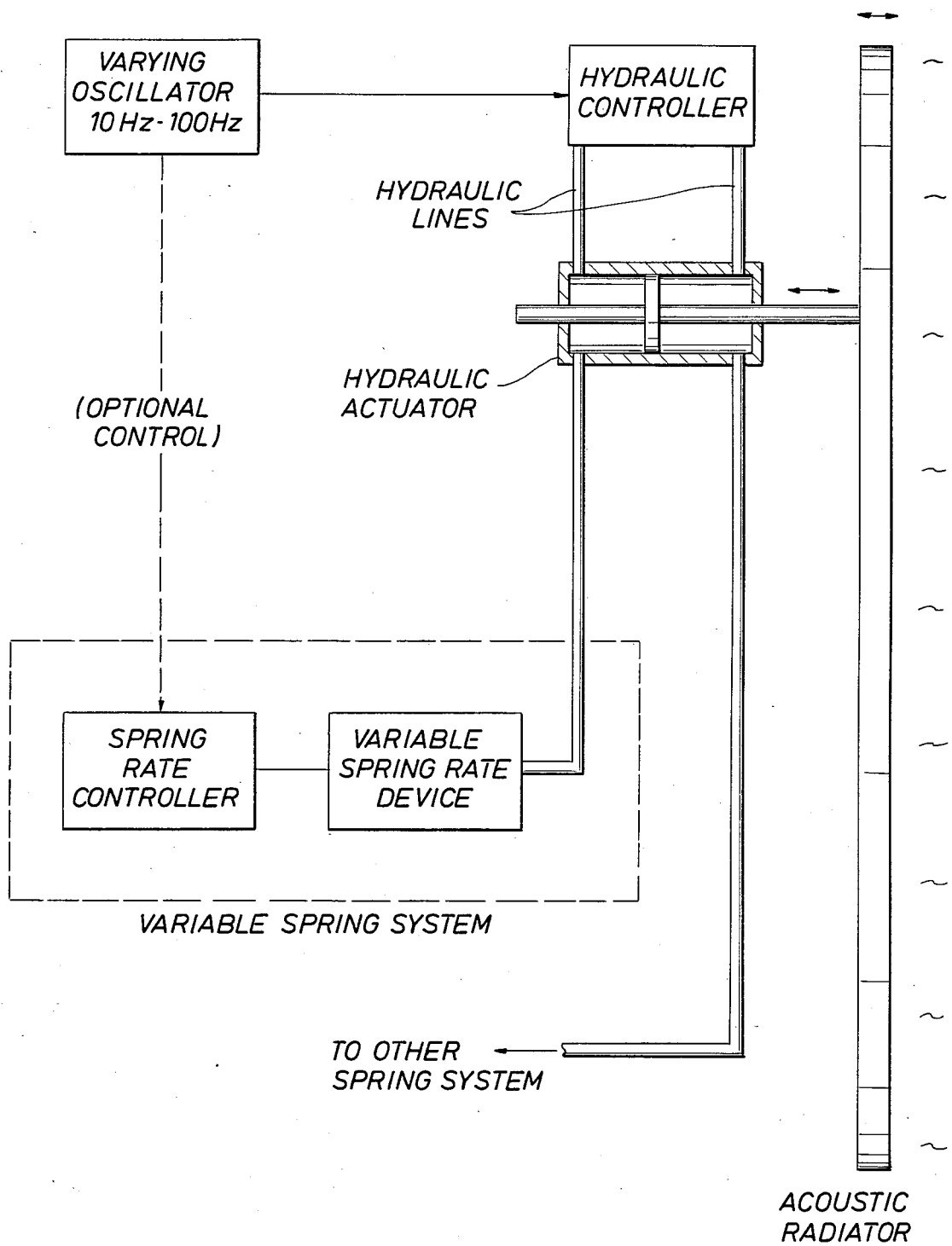
FIG. 1 is a block diagram of the invention.

The disclosed apparatus is conventional in some respects. In the preferred embodiment, the device emits a constantly varying FM signal which sweeps the low frequency spectrum included in the frequency range between about 10 Hz and about 100 Hz. The seismic source, as shown in the block diagram of FIG. 1, uses a fairly stiff radiator moving via a connection with a hydraulic actuator oscillating at the desired frequency. The hydraulic actuator is controlled in a typical manner by, e.g., a hydraulic controller, which may be a double-acting valve taking a signal from a varying oscillator through a servo valve. The invention, however, is unconventional in other respects. The hydraulic system driving each radiator is in communication with one or more variable hydraulic or oleo-pneumatic spring assemblies having a variable spring rate. The spring rate is varied as a function of frequency to continuously tune the acoustic output impedance of the transducers and, ideally, maximize the effective output power of the source. The term "oleo-pneumatic" is meant to include systems which include both a gas and a hydraulic fluid.

The term "spring rate", as used throughout this specification, is meant to be synonymous with the terms "spring constant" or "force constant". The terms describe only the change in force with respect to distance, i.e., dF/dx. This invention, as discussed elsewhere, relates to varying the spring rate as a function of frequency and, since the frequency of this genus of seismic sources often vary as a function of time, as a function of time.

The variable spring system is made up of two parts: a variable spring rate device which is hydraulically connected to the hydraulic actuator and has the function of varying the overall spring rate of the output load of the system and a spring rate controller which controls the spring rate directly or indirectly as a function of the drive frequency.

The variable spring system is used to achieve increased efficiency in marine seismic sources by adjusting the output acoustic impedance of the source transducer so that an increased amount of the input power is found in the output as acoustic energy. The transducers, or radiators as herein described, are continuously tuned as a function of the slowly varying FM output signal. The output impedance ($Z_r$) of a seismic source is the sum of two components: a resistive load (R) and a reactive load ($\omega M$; where $\omega$ is the radian frequency of vibration and M is the mass of the acoustic radiator plus the mass of fluid moving with the acoustic radiator).

$$Z_r = R + i\omega M$$

A spring will have the impedance:

$$Z_s = -iK/\omega$$

where K is the spring constant.

A spring may be sized and thereafter attached to the acoustic radiator to cancel the inertial loading due to the mass of the radiator and the fluid moving with the radiator. The force constant (K) of the spring is to be continuously changed as a function of the frequency of the source such that:

$$K = \omega^2 M$$

Each of the spring systems attached to a radiating plate operates to vary its overall spring constant in a fairly straight-forward manner. A double-acting piston in a hydraulic actuator moves an acoustic radiator. The piston is in contact with two separate liquid volumes within its cylinder. Each of these liquid volumes is, in turn, in communication with two separate fluid handling devices. The first is a hydraulic actuator which provides the motive force to oscillate the radiator. The second is an auxiliary device or variable spring rate device which varies either the overall volume of the spring system (if the system is filled only with a liquid) or the pressure and/or volume of the spring system (if the system contains both a liquid and a gas). Variation of volume and/or pressure allows the spring constant of a system to change and therefore modify the output impedance at its radiator.

Figure 2:
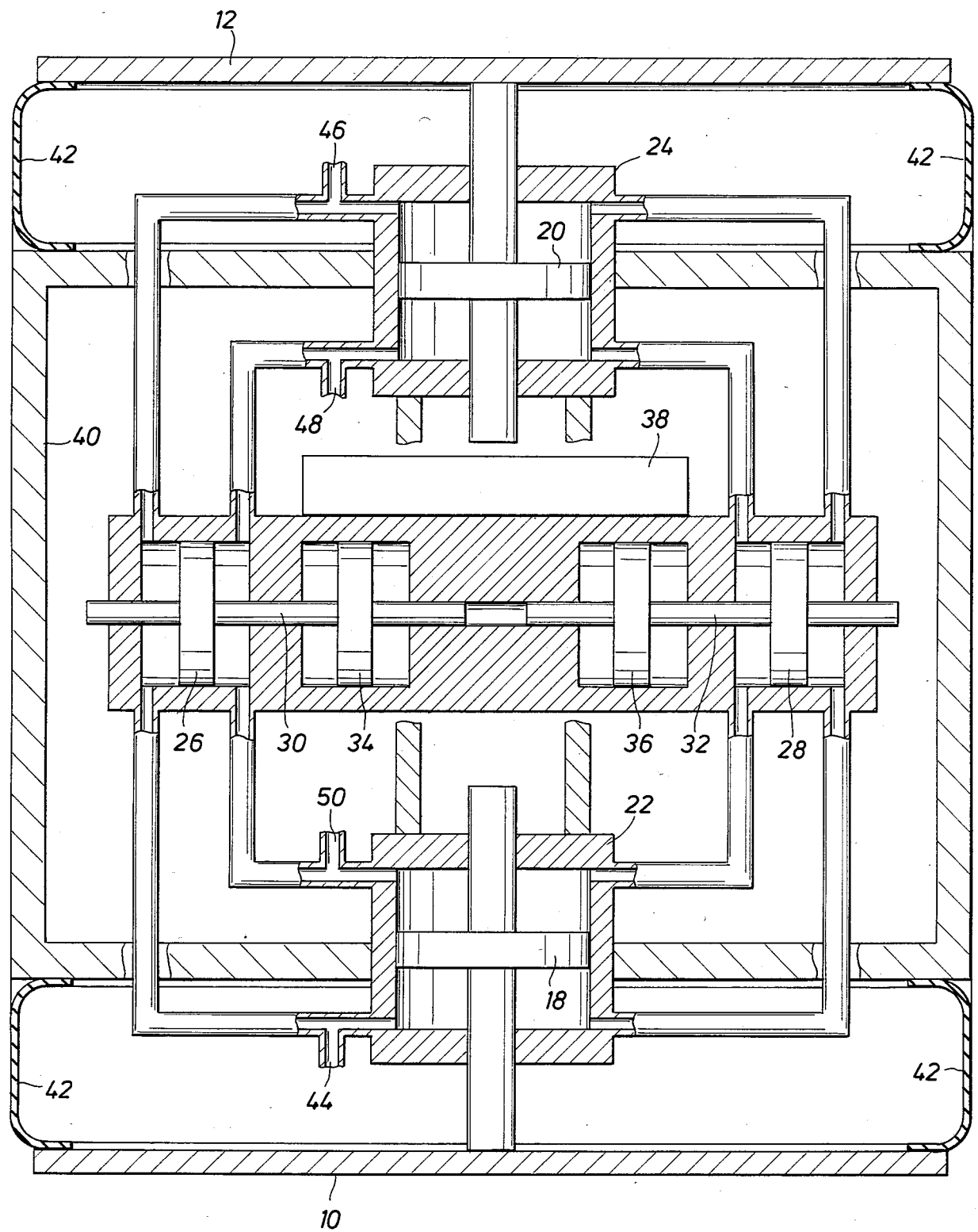
FIG. 2 schematically depicts, in cross-section, a seismic source built according to the invention.

In FIG. 2, radiating plates 10 and 12 are mechanically actuated by hydraulic actuating pistons 18 and 20. Actuating pistons 18 and 20 are double-acting and are reciprocated in hydraulic actuator cylinders 22 and 24 under modulation from hydraulic control pistons 26 and 28. Hydraulic pistons 26 and 28 are each on a common connecting shaft 30 and 32 with servo control pistons 34 and 36. The servo control pistons are reciprocated by servo valve 38. Servo valve 38 is an electrohydraulic device of conventional design controlled by an oscillator. The embodiment shown in FIG. 2 also has a frame 40 which supports all of the component parts and flexible water-tight seals 42 connected between the frame 40 at the radiating plates 10 and 12 to keep water from the internal portion of the device. The interior may be pressurized with an inert gas to assist in keeping surrounding water out of the seismic source. It is intended that radiating plates 10 and 12 be in contact with water only on their outer surfaces.

In each of the hydraulic lines between the volumes on both sides of the hydraulic actuating pistons 18, 20 and their respective hydraulic control pistons 26, 28 are found two sets of connections. The outboard hydraulic connections 44, 46 and inboard hydraulic connectors 48, 50 are in open communication with one or more variable spring rate devices described, infra. The variable spring rate devices operate by controlling the flow of hydraulic fluid out of the hydraulic connections 44, 46, 48 and 50 as a function of the driving frequency of the seismic sources and are in open hydraulic communication with the hydraulic volumes adjacent hydraulic actuating pistons 18 and 20.

The device shown in FIG. 2 operates in the following manner. Servo valve 38, under control of an oscillator (not shown) operating at a desired frequency or varying frequency at a specific rate, moves pistons 34 and 36 simultaneously outboard from the middle of the seismic source. The resultant force is transmitted respectively through shafts 30 and 32 to hydraulic control pistons 26 and 28. The hydraulic fluid thereafter transmits the force through the respective hydraulic lines to the inside or outside faces of hydraulic actuating pistons 18 and 20. The resulting movement of the acoustic radiating plates 10 and 12 is 180° out of phase. When one plate moves in the direction away from the center of the seismic source, the other plate moves in the opposite direction. Consequently, the forces imposed on the supporting frame 40 are balanced thereby negating the need for a large frame.

Focusing, for the purposes of illustration, on the hydraulic circuit comprising hydraulic control piston 26, hydraulic actuating piston 18, the hydraulic lines between those two piston volumes, outboard hydraulic connection 44, and inboard hydraulic connection 50, the operation is described below.

As control piston 26 moves inward, the volume facing the inside face of piston 26 and containing hydraulic fluid gets smaller. The hydraulic fluid therein is displaced out into the hydraulic line connecting to the inside volume facing hydraulic actuating piston 18. Simultaneously, the volume on the outside of hydraulic control piston 26 increases and tends to displace the fluid found on the volume found on the outside face of hydraulic actuating piston 18 back into the outside volume of piston 26. As these simultaneous displacements of fluids occur, hydraulic actuating piston 18 moves outward carrying acoustic radiating plate 10 with it. More importantly, from the viewpoint of explaining this invention, as the hydraulic fluids move within the two hydraulic lines, there is a tendency for the fluids to move out of connection 50 and into connection 44. Hydraulic or oleo-pneumatic variable spring systems may be connected to those hydraulic connections to tune the output impedance of the seismic source. As explained above, the spring system may be varied to maximize the energy imparted into the liquid in contact with radiating plate 10.

The hydraulic fluid found at the outboard hydraulic connections 44, 46 may be connected a single variable spring system and the inboard hydraulic connections 48, 50 may be connected to another variable spring system. Alternately, each hydraulic connection may be connected to a discrete variable spring system.

The effective force constant or spring rate of the fluid springs described herein is:

$$K = dF/dx = A^2 B/V$$

where,
A = area of the hydraulic actuating piston
V = fluid volume in the spring
B = adiabatic bulk modulus of the fluid Once the area of the piston has been chosen, to increase K the fluid volume of the spring can be decreased or the bulk modulus of the fluid increased.

The bulk modulus of a liquid is essentially constant. So for a spring containing only liquid, the force constant of the spring system is inversely proportional to the volume of the system.

For the purposes of discussing the theory of operation, it is assumed that the overall compliance of the fluids found in the hydraulic circuits shown in FIG. 2 is small compared to the compliance of the fluid in the hydraulic or oleo-pneumatic spring system. It should be apparent that since the two are interconnected, the volume of the fluids in those hydraulic circuits will have some effect on the overall spring rate.

Since the compliance of a gas is much greater than the compliance of a liquid, if the spring system were to contain a gas, the bulk modulus as well as the system volume could be varied. From the adiabatic gas law $$B = \gamma P$$

where $\gamma$ = adiabatic constant ($\gamma = 1.4$ for simple gases) and P = pressure.

Further, if the adiabatic gas law is used to provide an expression for the gas volume of the spring system, i.e.:

$$V = cP^{-1/\gamma}$$

then $$K = 1.4/cA^2 P^{1.71}$$

Thus, for a spring system containing a constant amount of gas subjected to adiabatic changes, the effective spring constant of the system varies approximately with the 1.7 power of its pressure.

The spring system may be configured so that the amount of gas within the variable spring rate device is varied either alone or in conjunction with a pressure change. The mathematical expression for the resulting overall spring rate is accordingly much more complicated.

Figure 3A:
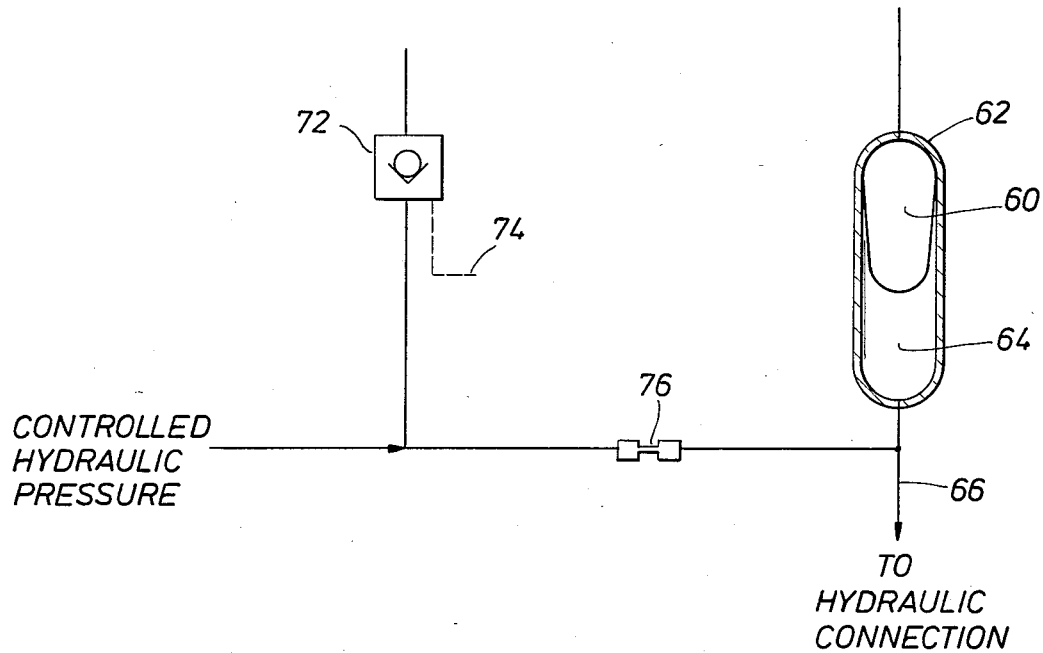
FIGS. 3A and 3B show two schematic variations of adjustable oleo-pneumatic springs suitable for use in the invention.
Figure 3B:
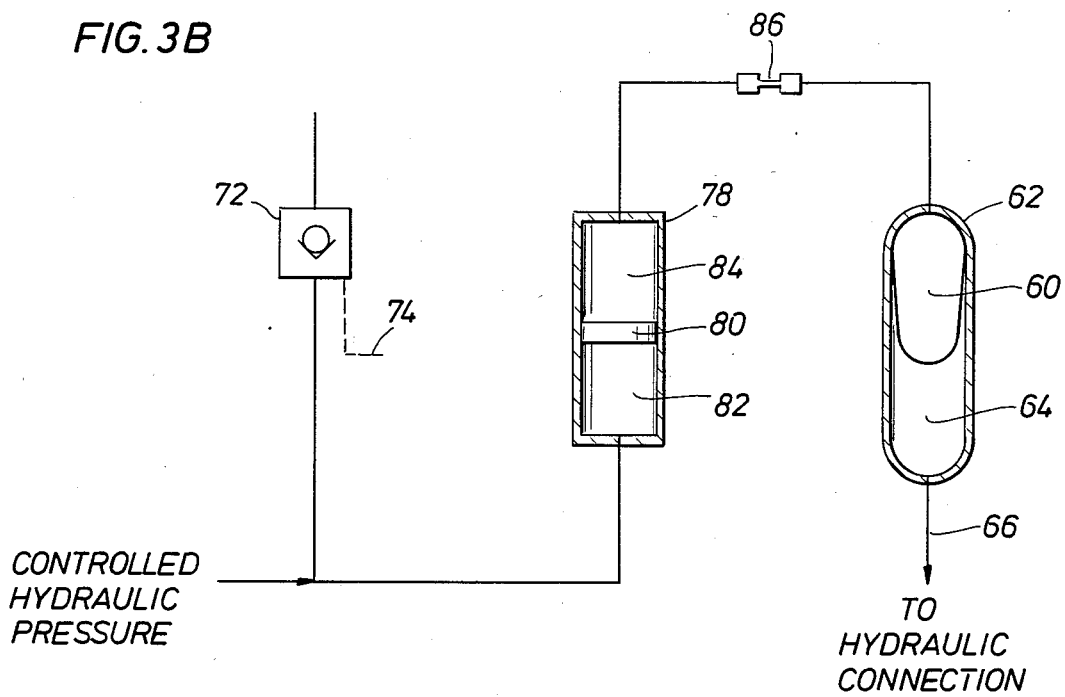
Figure 5B:
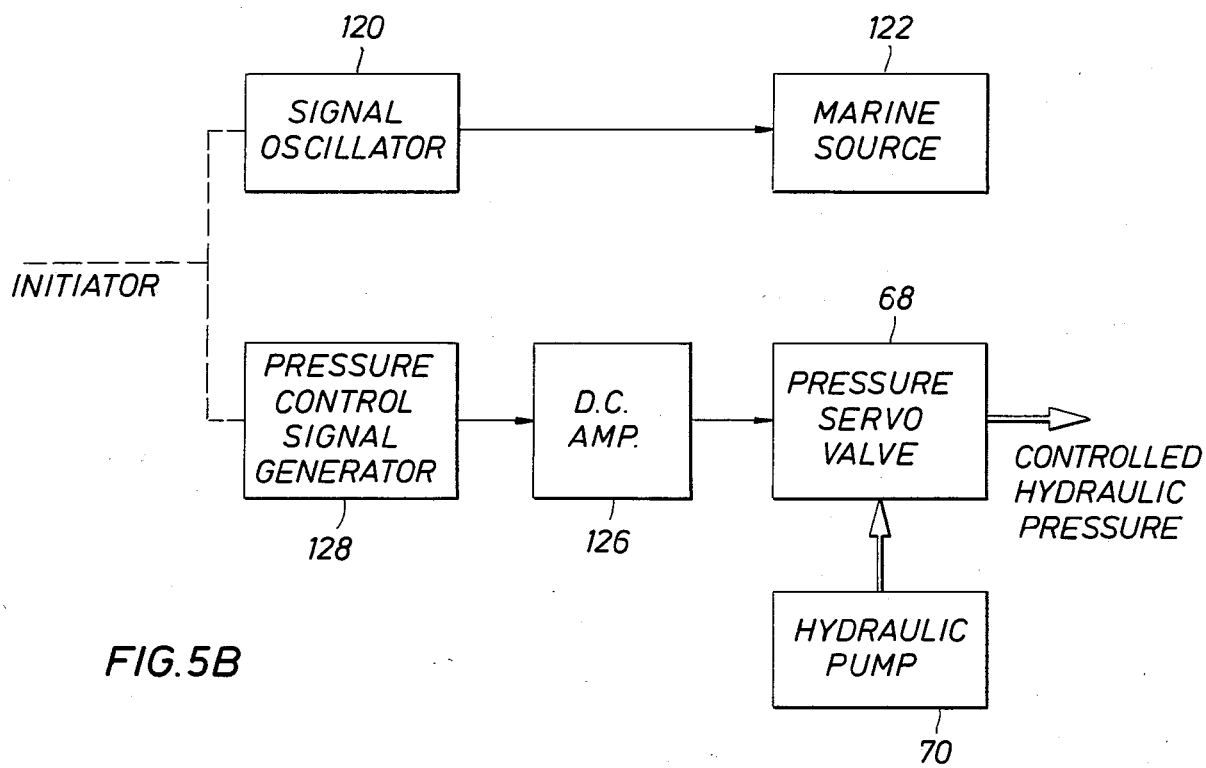
FIGS. 5A and 5B are block diagrams of the control circuit of the inventive seismic source.
Figure 5A:
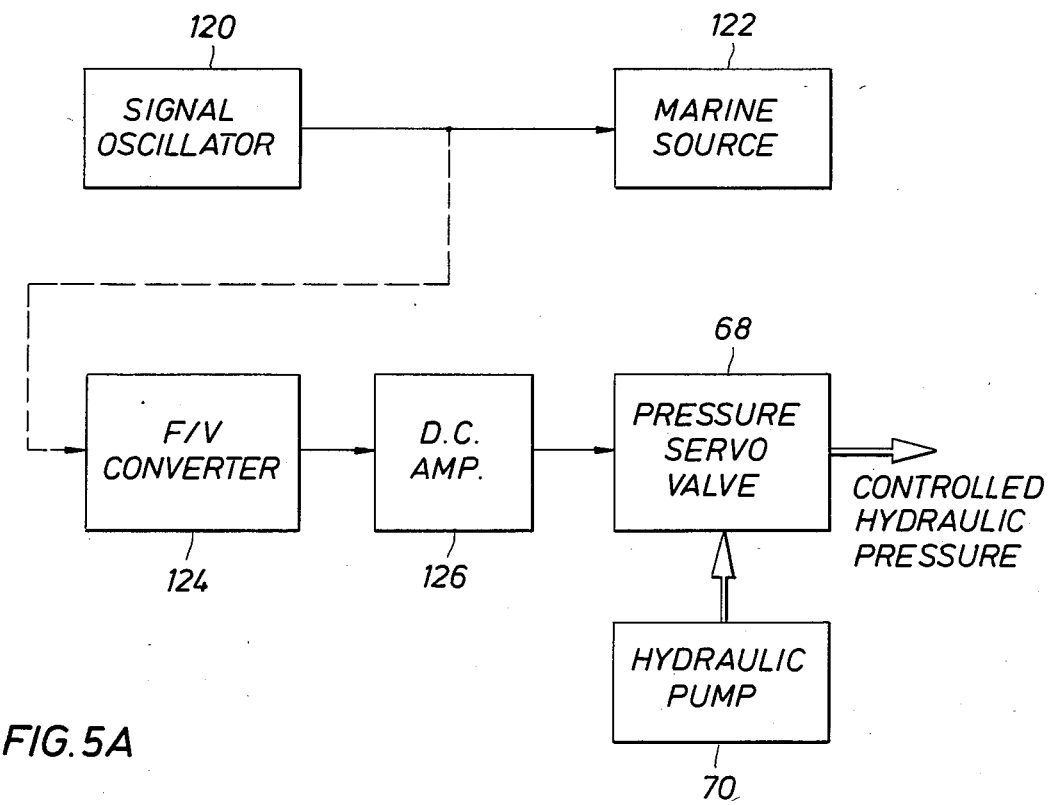

FIGS. 3A and 3B depict gas-containing variable spring-rate apparatus suitable for attachment to the inboard and outboard hydraulic connection, e.g., 50 and 44, of FIG. 2. FIGS. 5A and 5B show control circuits suitable for providing a controlled hydraulic pressure to the apparatus of FIGS. 3A and 3B.

The variable spring rate device in FIG. 3A is a two-phase system, the spring constant of which varies approximately with the 1.7 power of the pressure of the system. A constant amount of gas 60 is maintained in an accumulator vessel 62. Some amount of liquid 64 is held in the accumulator 62. The liquid may be of any convenient type but most likely is a hydraulic fluid or an oil. The accumulator 62 is connected to a hydraulic connection, e.g., 44 or 50, below the liquid level of the accumulator 62 via hydraulic line 66. The pressure in the accumulator 62 is controlled and varied by a source such as shown in FIGS. 5A or 5B and discussed below. It is also contemplated that a check valve 72, which is controlled to reduce the pressure in the system via control line 74, be included and actuated at the end of each seismic source frequency sweep. A choke 76, having substantial dynamic liquid flow impedance, is placed between the accumulator vessel 62 and the hydraulic fluid source or pressure servo valve 68.

It is anticipated that the compliance of the liquid in the fluid springs shown in FIGS. 3A and 3B is small compared to the compliance of the enclosed gas.

FIG. 3B illustrates another variable rate spring device which can be attached to an inboard or outboard hydraulic connection, e.g., 44, 46, 48 or 50. It includes an accumulator vessel 62 having a liquid volume 64 and gas volume 60 therein. As with the device in FIG. 3A, the liquid in accumulator vessel 62 is in communication with the hydraulic fluid such as that discussed with regard to hydraulic control piston 26 and hydraulic actuator piston 18, supra. However, in this configuration the pressurized fluid is introduced into an intermediate cylinder 78 having a free-floating piston 80 with pressurized liquid 82 on one side and a gas 84 on the other. A gas choke 86 having substantial impedance to the dynamic flow of gas is placed between the gas volumes of the intermediate cylinder 78 and the accumulator vessel 62. The choke limits the effective dynamic volume of the spring system to exclude the portion schematicized to the left of choke 86. The configuration permits the amount of gas within the variable spring rate device to be varied along with the pressure. As in the variation in FIG. 3A, a controllable check valve 72 is desirably included in the liquid portion of the circuit so that the pressure may be reduced by a control line 74 to a predetermined value at the end of each frequency sweep.

Figure 4:
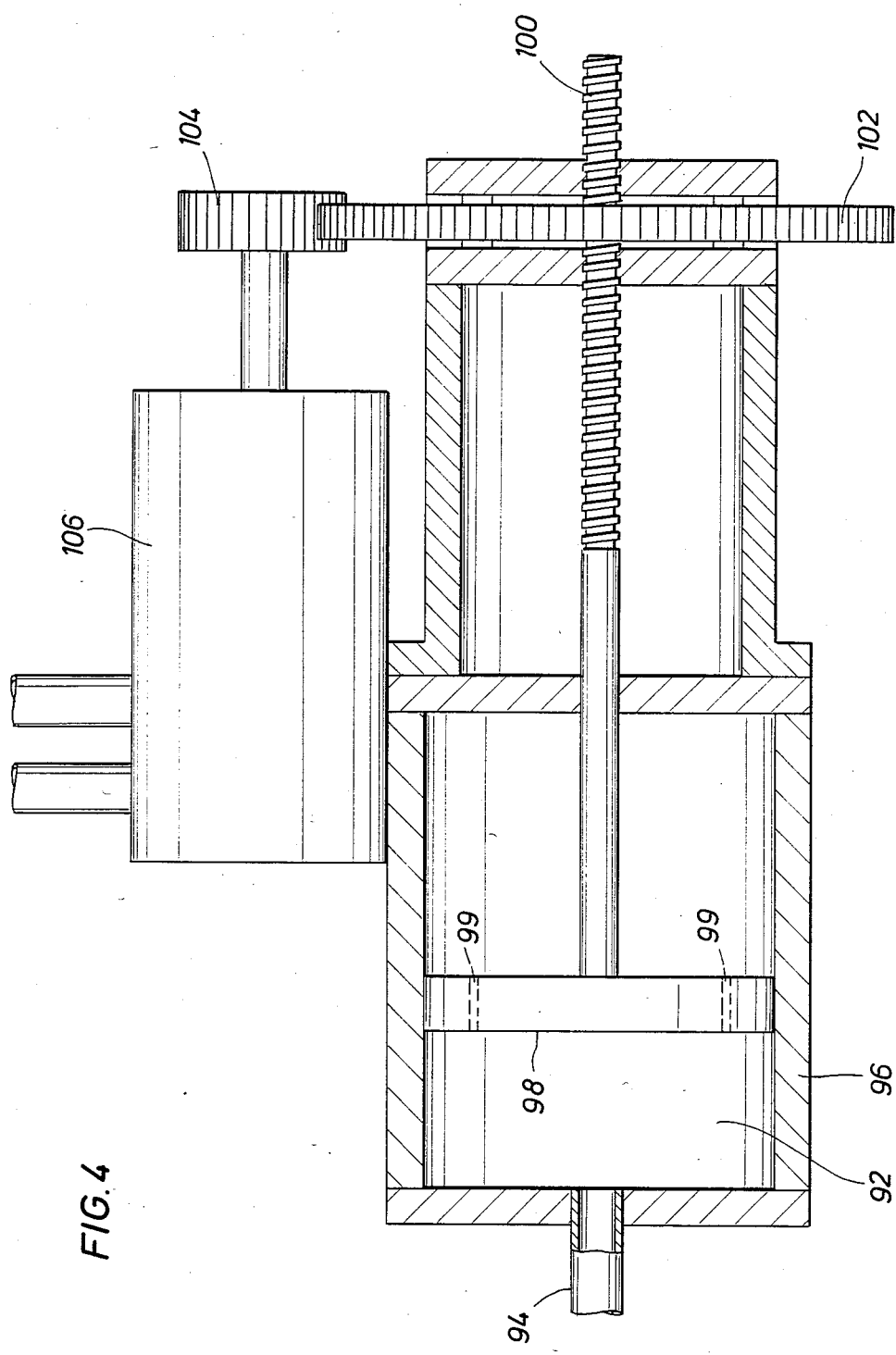
FIG. 4 shows apparatus which can be used to vary the effective oil volume of the inventive hydraulic springs.

The device in FIG. 4 is intended to be used on a completely liquid-filled spring system. As discussed above, the effective spring rate of such a system does not change appreciably with changing pressure but will vary as a function of system volume. The changing liquid volume 92 is connected to one of the hydraulic connections, e.g., 44, 46, 48 or 50 in FIG. 2, via a hydraulic line 94. Volume 92 is defined by a cylinder 96 and a movable piston 98. Piston 98 includes a sufficient number of small holes 99 which have a high impedance to dynamic liquid flow but allow liquid to pass through at a rate commensurate with the motion of piston 98.

Piston 98 is moved, and therefore the volume 92 is changed, as a function of the changing frequency, by a threaded shaft 100. The threaded shaft 100 is moved by the influence of gears 102 and 104. In this variation, threaded shaft 100 does not rotate, but instead meshes with threads internal to gear 102. As gear 102 rotates, shaft 100 pulls piston 98 one way or the other in cylinder 96. Gear 102 is driven by a gear 104 directly coupled to a hydraulic motor 106. Hydraulic motor 106 is controlled in such a way as to vary volume 92 as a function of the square of the frequency emitted by the seismic source if, for instance, it is desired to vary the force constant linearly with frequency.

FIG. 5A schematically illustrates a method of producing a controlled hydraulic pressure suitable for use in the variable spring configuration shown in FIGS. 3A and 3B. Known swept signal sources utilize an electronic signal oscillator 120 to control the frequency of the inventive marine seismic source 122. Various analog devices, such as servo valve 38 in FIG. 2, are used to convert the electronic signal to a varying hydraulic signal suitable for introduction to the drive pistons. The schematic pressure controller takes a signal from signal oscillator 120 applies it to frequency-to-voltage analog converter 124 to produce a voltage which is a function of the frequency. The voltage is amplified by a linear DC amplifier 126. The output of the DC amplifier 126 is used to control a pressure servo valve 68. The pressure servo valve 68 adjusts the higher pressure generated by the hydraulic pump 70 to the lower pressure needed for the spring action.

The pressure controller circuit illustrated in FIG. 5B provides a varying DC voltage to pressure servo valve 68 which is produced independently of the signal oscillator 120. Pressure control signal generator 128 produces a varying DC voltage which is initiated at the same time as the frequency sweep from signal oscillator 120 but is a function of frequency. As in the schematic of FIG. 5A, the DC voltage is amplified in DC amplifier 126 and applied to pressure servo valve 68.

Figure 6:
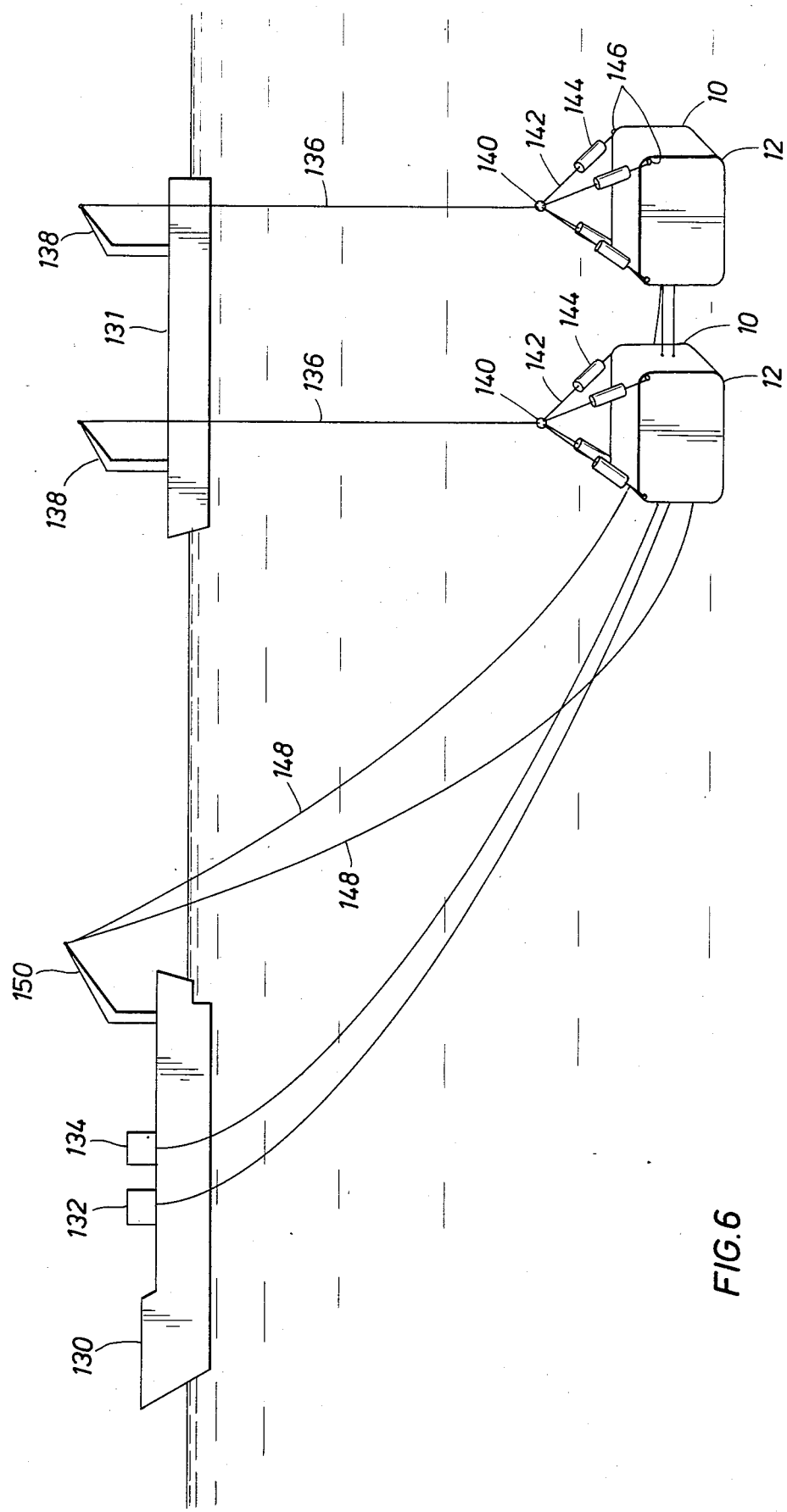
FIG. 6 depicts a deployment of the seismic source.

FIG. 6 shows a schematic view of a preferred embodiment of the inventive device in operation. The seismic source is operated from a support vessel 130 carrying auxiliary equipment such as hydraulic pump 132 and electronic control equipment 134. The seismic source is suspended at a proper depth by a lift cable 136 from float 131 by means of an arm 138.

The float 131 typically is not powered and is merely towed at a substantial distance behind the support vessel 130. The lift cable 136 may be connected to the seismic source via connector ring 140, a number of linkages 142, and shock absorbing springs 144 to a number of eye posts 146. The eye posts 146 may be welded to the frame of the source or onto the outer surfaces of radiating plates 10 and 12 near the midpoints of the curved leading and trailing edges of the radiating plates. The seismic source may be towed using a line 148 from a two arm 150. Clearly, the seismic source may be used in multiple configuration such as illustrated in FIG. 6 or be used singly. The manner of suspension and isolation described above is merely illustrative and other equivalent means of suspension and isolation could be used within the spirit of the invention.

It should be understood that the invention is not limited to fluid springs in which spring rates slavishly follow the disclosed theoretical equations. The equations provide an excellent estimate of the spring rate as a function of frequency, but innumerable variables inherent in a particular physical rendition of the invention will have some effect on the spring rate. For instance, particular lubricants used in the seismic source may exhibit non-Newtonian flow characteristics. The internal friction of the device would be non-linearly dependent upon frequency and therefore affect the overall spring constant.

The foregoing disclosures and description of the invention are only illustrative and explanatory thereof. Various changes in the size, shape and materials of construction, as well as in the details of the illustrated construction and operation, may be made within the scope of the appended claims without departing from the spirit of the invention.

I claim as my invention:

1. A marine seismic source comprising:
   at lease one acoustic radiator,
   a hydraulic actuator for oscillating each said acoustic radiator, each said hydraulic actuator being mechanically connected to its respective acoustic radiator and being adapted to oscillate said radiator so as to produce an acoustic signal having a frequency which varies with time, and
   a spring system having a variable spring rate, said spring system being in open hydraulic communication with said hydraulic actuators and having variable spring rate means adapted to vary the effective spring rate of said spring system as a function of frequency, whereby the output impedance of each said acoustic radiator is varied with its frequency.

2. The device of claim 1 wherein the means adapted for varying the effective spring rate are liquid filled and incorporate a moveable piston and cylinder adapted to vary the liquid filled volume of the spring system with said varying frequency.

3. The device of claim 1 wherein the means adapted for varying the effective spring rate is filled with a liquid and a gas and includes means for varying the pressure of the spring system with said varying frequency.

4. A marine seismic source comprising:
   dual opposed acoustic radiators,
   a hydraulic actuator for oscillating each of said dual acoustic radiators, each said hydraulic actuator being mechanically connected to its respective acoustic radiator and being adapted to oscillate said radiator so as to produce a repeating acoustic signal in water having a frequency which varies with time, and
   a spring system having a variable spring rate, said spring system being in open hydraulic communication with each of said hydraulic actuators and having variable spring rate means adapted to vary the effective spring rate of said spring system as a function of said frequency whereby the output impedance of each said acoustic radiator is varied with its frequency.

5. The device of claim 4 wherein the means adapted for varying the effective spring rate are liquid filled and incorporate a moveable piston and cylinder adapted to vary the liquid filled volume of the spring system with said frequency.

6. The device of claim 4 wherein the means adapted for varying the effective spring rate is filled with a liquid and a gas and includes means for varying the pressure of the spring system with said frequency.

7. The device of claim 6 wherein the means for varying the pressure of the spring system includes a valve adapted to return said pressure to a preset value at the beginning of each repeating signal.

8. The device of claim 6 wherein the means for varying the pressure of the spring system includes an accumulator vessel containing all gas within the spring system.

9. The device of claim 5 which additionally includes an oscillator for controlling said hydraulic actuator, a frequency-to-voltage converter suitable for detecting the frequency of the oscillator and converting it to a direct current voltage, an amplifier adapted to linearly amplify said direct current voltage to a higher level, and a pressure servo valve suitable for producing said varying spring system pressure.

10. The device of claim 6 which additionally includes an oscillator for controlling said hydraulic actuator, a pre-set pressure control signal generator producing a direct current voltage which changes simultaneously with the frequency and can be initiated at the same time as the oscillator, and a pressure servo valve suitable for producing said varying spring system pressure.

11. A marine seismic source comprising:
    dual opposed acoustic radiating plates,
    a hydraulic actuator for oscillating each of said dual acoustic radiating plates, each said hydraulic actuator being mechanically connected to its respective acoustic radiating plate and being adapted to oscillate aid radiating plate so as to produce a repeating acoustic signal in water, the frequency of which varies about linearly from about 10 Hz to about 20 Hz,
    a spring system having a variable spring rate, said spring system being in open hydraulic communication with each of said hydraulic actuators and having variable spring rate means adapted to vary the effective spring rate of said spring system as a function of said frequency,
    a frame for supporting said acoustic radiating plates, said actuators, and said spring system,
    whereby the output impedance of said acoustic radiating plates is varied with their frequency.

12. The device of claim 11 wherein the means adapted for varying the effective spring rate are liquid filled and incorporate a moveable piston and cylinder adapted to vary the liquid filled volume of the spring system with the frequency.

13. The device of claim 11 wherein the means adapted for varying the effective spring rate is filled with a liquid and a gas and includes means for varying the pressure of the spring system with said frequency.

14. The device of claim 13 wherein the means for varying the pressure of the spring system includes a valve adapted to reset said pressure to a pre-set value at the beginning of each repeating signal.

15. The device of claim 13 wherein the means for varying the pressure of the spring system includes an accumulator vessel containing all gas within the spring system.

16. The device of claim 13 which additionally includes an oscillator for controlling the actuator, a frequency-to-voltage converter suitable for detecting the frequency of the oscillator and converting it to a direct current voltage, an amplifier adapted to linearly amplify said direct current voltage to a higher level, and a pressure servo valve suitable for producing said varying spring system pressure.

17. The device of claim 13 which additionally includes an oscillator for controlling the actuator, a pre-set pressure control signal generator producing a direct current voltage which changes simultaneously with the frequency and can be initiated at the same time as the oscillator, and a pressure servo valve suitable for producing said varying spring system pressure.

* * * * *